(12) United States Patent
Pittini et al.

(10) Patent No.: US 9,500,265 B2
(45) Date of Patent: Nov. 22, 2016

(54) LINEAR DRIVE

(71) Applicant: MAXON MOTOR AG, Sachseln (CH)

(72) Inventors: Raniero Pittini, Hergiswil (CH); Max Erick Busse-Grawitz, Alpnach Dorf (CH); Mathieu Roulet, Lucerne (CH); Dominique Martin, Lucerne (CH); Rene Waldvogel, Stansstad (CH)

(73) Assignee: Maxon Motor AG, Sachseln (CH)

( * ) Notice: Subject to any disclaimer, the term of this patent is extended or adjusted under 35 U.S.C. 154(b) by 149 days.

(21) Appl. No.: 14/085,634

(22) Filed: Nov. 20, 2013

(65) Prior Publication Data

US 2014/0137679 A1    May 22, 2014

(30) Foreign Application Priority Data

Nov. 21, 2012 (DE) .................. 10 2012 022 798

(51) Int. Cl.
| | |
|---|---|
| *F16H 19/04* | (2006.01) |
| *F16H 19/06* | (2006.01) |
| *F16H 25/20* | (2006.01) |
| *H02K 7/10* | (2006.01) |
| *F16D 37/02* | (2006.01) |
| *H02K 7/112* | (2006.01) |
| *F16H 57/12* | (2006.01) |

(52) U.S. Cl.
CPC ............ *F16H 19/04* (2013.01); *F16H 19/06* (2013.01); *F16H 25/20* (2013.01); *H02K 7/1004* (2013.01); *F16D 37/02* (2013.01); *F16H 2019/0681* (2013.01); *F16H 2057/122* (2013.01); *H02K 7/1125* (2013.01); *Y10T 74/1884* (2015.01); *Y10T 74/18576* (2015.01); *Y10T 74/18792* (2015.01); *Y10T 74/18808* (2015.01)

(58) Field of Classification Search
CPC ... F16H 19/04; F16H 2057/122; F16D 37/02
See application file for complete search history.

(56) References Cited

U.S. PATENT DOCUMENTS

| | | | | |
|---|---|---|---|---|
| 3,971,620 A | * | 7/1976 | Everett | G02B 23/165 359/430 |
| 4,270,404 A | * | 6/1981 | Murakoshi | F16H 25/02 248/913 |
| 4,469,242 A | * | 9/1984 | Costa | G07F 11/58 221/114 |
| 5,314,141 A | * | 5/1994 | Ishii | G11B 15/17 242/336 |
| 7,999,429 B2 | * | 8/2011 | Ogawa | F16D 27/004 192/21.5 |
| 8,157,689 B2 | * | 4/2012 | Steinwender | E05D 11/082 475/154 |
| 2011/0239795 A1 | * | 10/2011 | Uchida | F16H 57/12 74/89.17 |

FOREIGN PATENT DOCUMENTS

| | | |
|---|---|---|
| DE | 31 28 959 A1 | 4/1982 |
| DE | 195 42 059 A1 | 11/1996 |
| DE | 197 35 897 A1 | 2/1999 |

(Continued)

*Primary Examiner* — William Kelleher
*Assistant Examiner* — Gregory Prather
(74) *Attorney, Agent, or Firm* — Dickinson Wright PLLC

(57) ABSTRACT

The present invention relates to a linear drive with a stator, a runner, and two rotative drive units provided for driving the runner. It is provided according to the invention that the linear drive comprises two magnetorheological clutches, wherein the first drive unit can be coupled to the runner using a first magnetorheological clutch and the second drive unit can be coupled to the runner using a second magnetorheological clutch. The output torque of the first drive unit acts upon the runner in the opposite direction to the output torque of the second drive unit.

13 Claims, 4 Drawing Sheets

(56) References Cited

FOREIGN PATENT DOCUMENTS

| DE | 19933234 | 3/2000 |
| DE | 100 18 811 A1 | 10/2001 |
| DE | 10 2009 046 648 A1 | 5/2011 |
| EP | 0 799 672 A1 | 10/1997 |
| EP | 1 154 172 A2 | 11/2001 |

* cited by examiner

LINEAR DRIVE

This application claims benefit of the filing date of DE 102012022798.1, filed Nov. 21, 2012, the entire contents of which is incorporated herein by reference for all purposes.

BACKGROUND

1. Field

The present invention relates to a linear drive with a stator, a runner, and two rotative drive units provided for driving the runner.

2. Description of Related Art

A linear drive of the kind previously mentioned is known for example from DE 199 33 234 A1. The linear drive disclosed therein comprises a rotatably mounted spindle which serves to drive a carriage movably mounted in the axial direction of the spindle. The spindle is driven by two electric motors which are disposed at opposite ends of the spindle. The two electric motors always have the same direction of rotation. The torque acting upon the spindle is therefore generated to equal amounts by the two electric motors. By using two electric motors instead of a single electric motor, compact construction of the linear drive is enabled, the motor size is reduced, and the vibration noise is lessened.

A linear drive is known from DE 100 46 137 A1 in which the two drive units are alternately coupled to the runner of the linear drive in order to thereby achieve a continuous motion of the runner. The two drives can be embodied, for example, as bistable lifting magnets, lifting magnets with a passive return spring, piezo transducers, pneumatic cylinders or SMA actuators. The force coupling between the drives and the runner can be effected by a magnetic coupling mechanism, by electrostatic forces of attraction, or any appropriately designed mechanical configurations. Friction forces, magnetic and electrostatic forces, media changing their viscosity or elasticity, and changing chemical binding forces are generally spoken of in connection with the force coupling.

Many applications of linear motors today require highly dynamic drives, which are also subject to increased requirements in terms of compact design.

SUMMARY

The object of the present invention is therefore to provide a linear drive of the kind initially mentioned which is highly dynamic, can be easily controlled, and has a compact design.

The object is satisfied by the features of independent claim 1. According thereto, the object of the invention is satisfied for a linear drive of the kind mentioned, when the linear drive further comprises two magnetorheological clutches, wherein the first drive unit can be coupled to the runner using a first magnetorheological clutch and the second drive unit can be coupled to the runner by a second magnetorheological clutch, wherein the output torque of the first drive unit acts upon the runner in the opposite direction to the output torque of the second drive unit.

In the linear drive according to the invention, the output shafts of the two drive units therefore generally rotate in opposed directions. The two drive units at least effect driving forces acting in opposite directions upon the runner. This does not mean that the two output shafts must be arranged coaxially to each other. The output torque of the two drive units can act directly upon the runner, but it can also via a suitable mechanism be converted into a force acting upon the runner. To convert the rotary motion into a translational motion of the runner, various mechanical configurations can be provided. The runner of the linear drive is mounted such that it, or at least a part of the runner, can be moved translationally relative to the stator. For example, the runner can be a belt forming a closed loop and be clamped-in in such a manner that it always extends linearly in a specific section.

Highly dynamic operation of the linear drive is enabled by the two magnetorheological clutches and the output torques of the two drive units in the counter direction. This can achieve in particular a highly dynamic reversal of direction of the runner. The output torque of a drive unit actually applied can steplessly be adjusted by applying a controllable voltage to the respective magnetorheological clutch. If, for example, reversal of direction of the runner is to be effected, then the drive unit previously being engaged with the magnetorheological clutch is disengaged and the other drive unit is engaged. The runner is thereby decelerated immediately and accelerated in the opposite direction, respectively. To reverse the direction of motion, only the moments of inertia of the runner and the moments of inertia of the mechanism optionally provided between the clutches and the runner must be overcome. But any deceleration and acceleration, respectively, of the two drive units is not required. They both retain their direction of rotation as well as their rotational motion. The invention further has the advantage that reduction of the mechanical backlash can be achieved in a simple manner. This can be done in that a low voltage is applied to the magnetorheological clutch of that drive unit, which opposes the current direction of the motion of the runner, so that a low output torque is also effected by this drive unit upon the runner. Though this somewhat reduces the resulting output torque of the other drive unit, the advantage is, that this causes mechanical preloading of the drive, which in turn leads to a reduction of the mechanical backlash.

It can preferably be provided that the output shafts of the two drive units always rotate at a constant speed over the entire operating range of the linear drive. It is also advantageous, if the drive units each have only one direction of rotation. This simplifies controlling the linear drive.

Advantageous embodiments of the present invention are the subject matter of the dependent claims.

In one preferred embodiment of the present invention, the linear drive comprises an electric motor which is part of both the first drive unit as well as part of the second drive unit, wherein the linear drive further comprises a gear unit connected to the electric motor. The gear unit preferably comprises two counter-rotating gear output shafts, of which a first gear output shaft is coupled to the first magnetorheological clutch, and a second gear output shaft is coupled to the second magnetorheological clutch. In this embodiment, only a single electric motor is required providing the required output torque for both drive units. Preferably, the two gear output shafts are constantly driven by the electric motor. The driving force ultimately transmitted to the runner of the linear drive is thereby achieved by actuating the two magnetorheological clutches. Since the linear drive in this embodiment requires only a single electric motor, it is very cheap to produce and can also be easily controlled. This embodiment also allows for a compact design at a low weight of the linear drive.

In an alternative embodiment of the present invention, the two drive units each comprise their own electric motor. This embodiment allows a very flexible structure and is particularly suited when the output shafts of the two drive units are located at completely different mounting positions. Most preferably, the two drive units comprise not only each their own electric motor, but each also has its own gear unit. Step-down gear units are preferably used as a gear unit. They allow high torque at a compact design of the motors. This results in an overall compact and favorable construction of the linear drive.

In a further particularly preferred embodiment of the present invention, the linear drive comprises a control unit for actuating the two magnetorheological clutches, wherein the control unit ensures that an output torque from both drive units always acts upon the runner. It is of particular advantage, if the control unit ensures that the magnetorheological clutch of the drive unit actually being in engagement is completely closed, wherein the magnetorheological clutch of the respective other drive unit effects only a small transmission of force onto the runner. Mechanical preloading of the runner system is thereby effected, which leads to a reduction of the mechanical backlash. This embodiment therefore provides a high-precision linear drive.

The precision of controlling the linear drive is further enhanced and simplified, respectively, if the control unit comprises an actual value transmitter, in particular a rotary position transducer and/or a speed indicator and/or accelerometer. The actual motion of the runner can therewith be compared with the target values. The actual value transmitter can be provided at different locations of the linear drive. Measurement is performed preferably directly on the runner and/or on the output shafts of the two drive units. Respective actual value transmitters can also be provided on the motor shafts of the electric motors.

In another embodiment of the present invention, the runner comprises a gear rack which is driven by a first gear or a worm gear coupleable to the first drive unit and by a second gear or worm gear coupleable to the second drive unit. This embodiment achieves an extremely robust and precise linear drive. This embodiment also allows for a compact design, in particular when the first magnetorheological clutch and the second magnetorheological clutch are arranged directly adjacent to each other. A single electric motor can be provided by which the output shafts of the two drive units are driven, or each of the two drive units can be driven by its own electric motor. In both cases the gears or worm gears, respectively, are coupled with the associated drive units via the magnetorheological clutches.

In a further alternative embodiment of the present invention, the runner comprises a belt or a cable or a chain. Preferably, the belt, cable or chain form a closed loop, where the two drive units are arranged in two opposed reversal points of the loop. A section linearly extending between the two reversal points of the loop forms the actual runner. This section can be kept tensioned by the two drive units, so that the mechanical backlash of the linear drive is reduced. In addition to the belt or the chain or the cable, the runner of the linear drive can also comprise further elements. For example, a carriage connected to the belt, the cable or the chain can be provided, which is guided using a linear guide.

In a further alternative embodiment of the present invention, the linear drive comprises a threaded spindle. Linear drives with a threaded spindle drive are extremely robust, simple in structure, and can be very precisely controlled.

The mechanical backlash of such linear drives can be reduced or eliminated, respectively, by the use of spindle nuts preloaded relative to each other. It is conceivable that the threaded spindle itself forms part of the runner or the runner. The threaded spindle is mounted in a rotatably fixed manner and axially displaceable relative to the stator of the linear drive. Preferably, however, the threaded spindle merely serves to transform the rotary motion into a linear motion of the runner. In this case, the threaded spindle is mounted rotatable and axially undisplaceable relative to the stator of the linear drive, wherein the threaded spindle is in engagement with at least one of the two drive units and with the runner mounted axially displaceable relative to the stator. The runner itself can again be formed as a carriage comprising a linear guide on the stator of the linear drive. In the simplest case, only one threaded spindle is provided, which can be coupled to both drive units via the respectively associated magnetorheological clutches.

In a particularly preferred embodiment, the linear drive comprises a second threaded spindle extending parallel to the first threaded spindle and also being mounted rotatable and in axially undisplaceable relative to the stator of the linear drive, wherein the first threaded spindle is in engagement with the runner and the first drive unit, and the second threaded spindle with the runner and the second drive unit. The engagement between the threaded spindle and the first or second drive unit, respectively, is actuated by using the two magnetorheological clutches. Preloading of the system can in this embodiment be achieved in a simple manner by using the two threaded spindles. The preload in turn leads to no backlash in the linear drive.

In a further preferred embodiment, the magnetorheological clutches are each realized by a differential with a magnetorheological brake, the differential comprising one input member and two output members, and wherein one of the output members can be braked using of the magnetorheological brake. The braked output element is generally unused, whereas the respectively other output member is preferably coupled to the runner. A common differential gear can serve as a differential. This embodiment can be realized in a particularly simple manner and has the advantage that the live parts of the magnetorheological brake can be embodied in a fixed manner. A complex sliding current transfer can therefore be omitted.

Embodiments of the present invention are explained in more detail below with reference to drawings.

DETAILED DESCRIPTION OF SPECIFIC EMBODIMENTS

Figure 1:
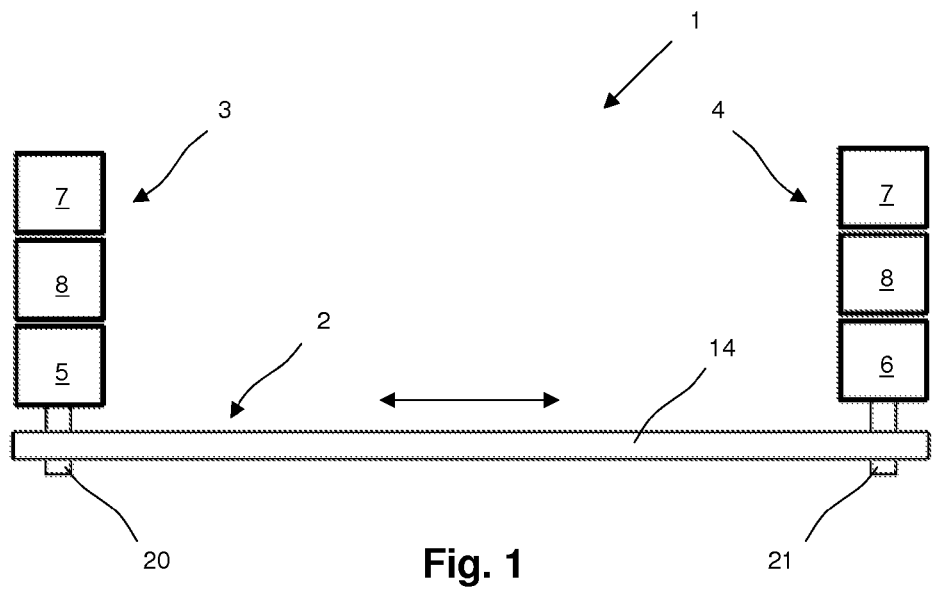
FIG. 1 shows a schematic plan view of a linear drive of the invention according to a first embodiment.

It applies to the following embodiments that like parts are designated by like reference numerals. If a drawing contains reference numerals which are not explained in the accompanying figure description, then reference is made to preceding or subsequent figure descriptions.

Figure 2:
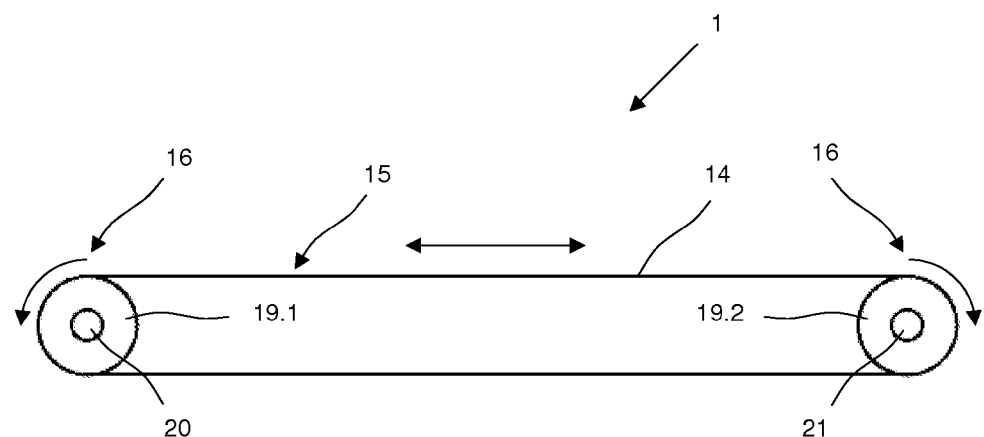
FIG. 2 shows a side view of the linear drive of the invention from FIG. 1.

FIG. 1 shows a schematic representation of a linear drive 1 according to the invention which is embodied as a belt drive. FIG. 1 shows a plan view, FIG. 2 shows the side view thereof. In this variant of the linear drive according to the invention, the runner 2 is formed by a belt 14, which can selectively be driven by the two drive units 3 and 4. The belt 14 forms a closed loop 15, at the reversal points 16 of which the drive wheels 19.1, 19.2 of the two drive units 3 and 4 are arranged. The belt 14 is tensioned by the two drive wheels. Each of the drive units 3 and 4 comprises an electric motor 7 and a step-down gear unit 8 attached thereto. This structure of the drive units leads to a compact construction of the linear drive, since relatively low-performance and therefore small electric motors can be used due to the step-down gear unit, although high torques are still provided. The drive wheels 19.1, 19.2 being in engagement with belts 14 are not directly connected to the drive units 3 and 4. They are disposed on drive shafts, which can each be coupled via a magnetorheological clutch to the associated drive unit. The drive shaft 20 shown on the left can be coupled to the gear output shaft of the first drive unit 3 by the magnetorheological clutch 5, the drive shaft 21 on the right side can be coupled to the second drive unit 4 using the magnetorheological clutch 6. The two parallel-aligned output shafts of the two drive units 3 and 4 always rotate in opposite directions. This means that the drive wheel 19.1 in the diagram of FIG. 2 rotates counter-clockwise when the drive shaft 20 is connected via the magnetorheological clutch 5 to the first drive it 3 whereas the drive wheel 19.2 rotates in the clockwise direction when the drive shaft 21 is coupled via the magnetorheological clutch 6 to the second drive unit 4. By simultaneously releasing the first magnetorheological clutch and closing the second magnetorheological clutch, there is therefore a reversal of the direction of motion of the runner. By applying controllable voltage to the two magnetorheological clutches, they can also be partially opened or closed, respectively. When both the clutches 5 and 6 are partially closed, the direction of motion of the runner is determined by which of the two drive shafts 20, 21 has the greater torque applied to it. In this case, the top section of the drive belt 14 shown in FIG. 2 is held tensioned. The other drive components are also preloaded relative to each other, so that the mechanical backlash of the linear drive is for the most part eliminated, or is reduced. For high precision of the linear drive, it is therefore of advantage if the two magnetorheological clutches 5 and 6 are always applied at least a minor voltage.

The electric motors of the two drive units 3 and 4 can maintain their direction of rotation and speed of rotation at all times. For reversal of the direction of motion of the runner, the direction of rotation of the two electric motors therefore does not need to be changed. Therefore, no moments of inertia of the electric motors or of the step-down gear unit attached thereto must be overcome when the direction of motion of the runner is reversed.

It should be noted that some figures are merely schematic representations. For example, the stator of the linear drive is not shown. The runner 2 of the linear drive according to the invention can also, in addition to the belt 14, comprise additional components such as a carriage being connected to the belt 14 and guided in a linear guide. The belt can, for example, be embodied as a toothed belt. Instead of the belt, also a chain or a cable can be used.

Figure 3:
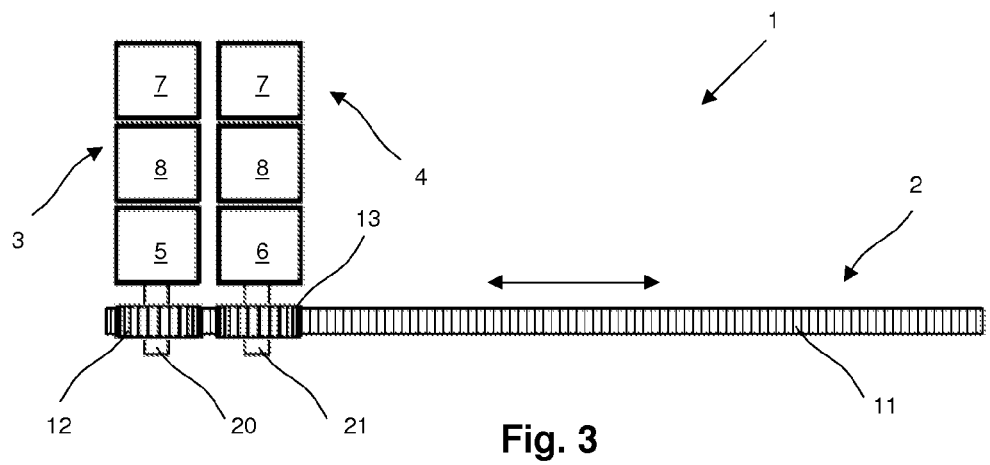
FIG. 3 shows a schematic plan view of a linear drive of the invention according to a second embodiment.
Figure 4:
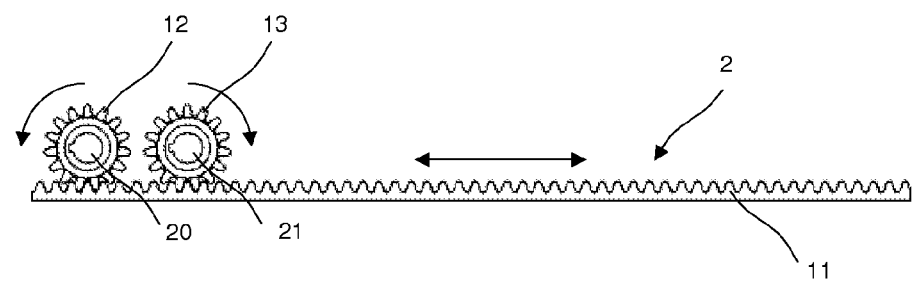
FIG. 4 shows a side view of the linear drive of the invention from FIG. 3.

FIGS. 3 and 4 show a further embodiment of the linear drive according to the invention. FIG. 3 shows a schematic plan view, FIG. 4. a side view. Here as well, two drive units 3 and 4 are provided for driving the runner 2, similarly to the linear drive of FIGS. 1 and 2. It is formed by a gear rack 11. It is supported by support devices—not shown—axially displaceable in the direction of its longitudinal axis on the stator of the linear drive. The two drive shafts 20 and 21 in this linear drive each carry a gear 12, 13. The two gears mesh with the teeth of the gear rack. Also with this drive, the directions of rotation of the two gear output shafts and the output torques of the two drive shafts 20 and 21, respectively, are in opposite directions. The two drive units 3, 4, and in particular the two magnetorheological clutches 5 and 6 are arranged directly adjacent to each other, whereby a very compact design of the linear drive 1 is achieved. The basic principle of the linear drive otherwise corresponds to the principle of the linear drive shown in FIGS. 1 and 2.

Figure 5:
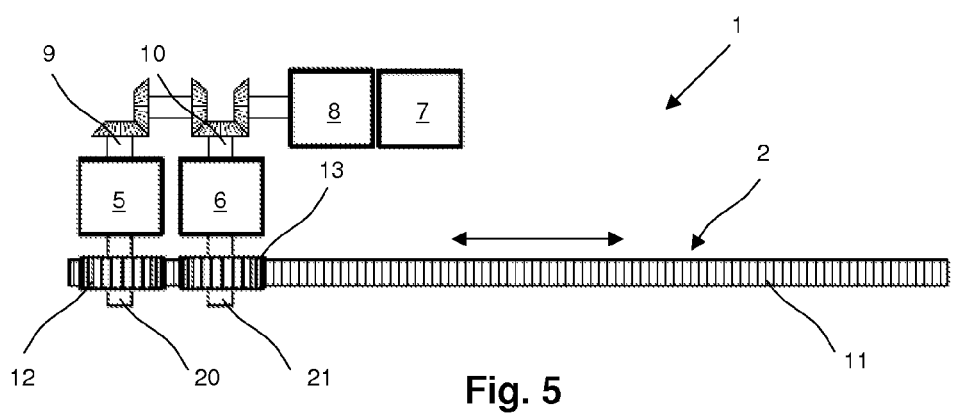
FIG. 5 shows a schematic plan view of the linear drive of the invention from FIGS. 3 and 4 in modified form.

FIG. 5 shows the linear drive of the invention from FIGS. 3 and 4 in a slightly modified form. Since the two magnetorheological clutches or the drive shafts 20 and 21 associated with the clutches, respectively, are disposed directly adjacent to each other, it is also possible to embody the two separate drive units 3 and 4 of FIG. 3 by a single electric motor 7 and a gear unit 8 attached thereto with two gear output shafts 9 and 10. The gear unit 8 is designed such that the direction of rotation of the gear output shaft 9 is opposite to the direction of rotation of the gear output shaft 10. Also in this drive variant, the direction of motion of the runner 2 is determined solely on the basis of the torques respectively applied to the two drive shafts 20 and 21. The torque is adjusted via the control voltage of the magnetorheological clutches 5 and 6.

Figure 6:
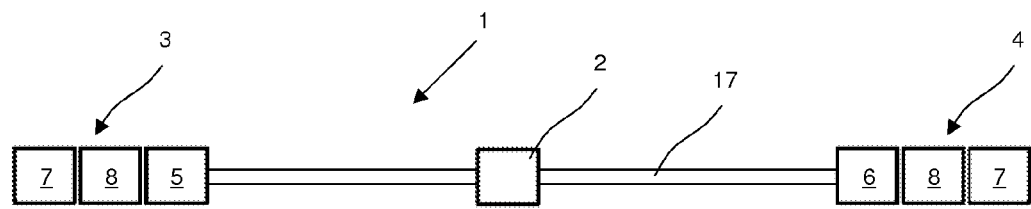
FIG. 6 shows a schematic representation of a linear drive of a further embodiment.

FIG. 6 shows a further embodiment of the linear drive according to the invention. In this variant, a spindle drive is used. The spindle 17 is mounted rotatable and axially undisplaceable on the stator of the linear drive 1. It is in engagement with a corresponding thread of the runner 2, so that the runner moves along the spindle axis when the spindle rotates. The runner 2 is therefore not rotatable, but merely supported axially displaceable on the stator of the linear drive. A drive unit 3, 4 is provided at each of the two ends of the threaded spindle 17. The drive units 3 and 4 generate a torque in the opposite direction and can each be coupled using of a magnetorheological clutch 5, 6 with the spindle itself. The drive shown in FIG. 6 is characterized by a very slim design, but is designed relatively long.

Figure 7:
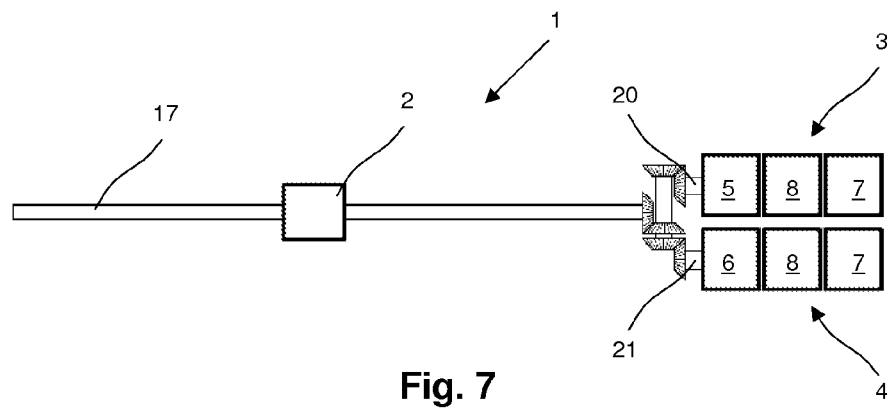
FIG. 7 shows a schematic illustration of a variant of the linear drive of the invention from FIG. 6.

FIG. 7 shows a variant of the linear drive shown in FIG. 6, in which both drive units 3 and 4 are disposed at the same end of the threaded spindle. In the example shown, the two drive shafts 20 and 21 are coupled via gear engagement with the threaded spindle 17. However, it is also possible to dispose the two magnetorheological clutches 5 and 6 coaxially relative to each other, so that the threaded spindle 17 forms the output shaft of both magnetorheological clutches. The linear drive shown in FIG. 7 is designed slightly shorter than the linear drive of FIG. 6 It is therefore not as slim.

Figure 8:
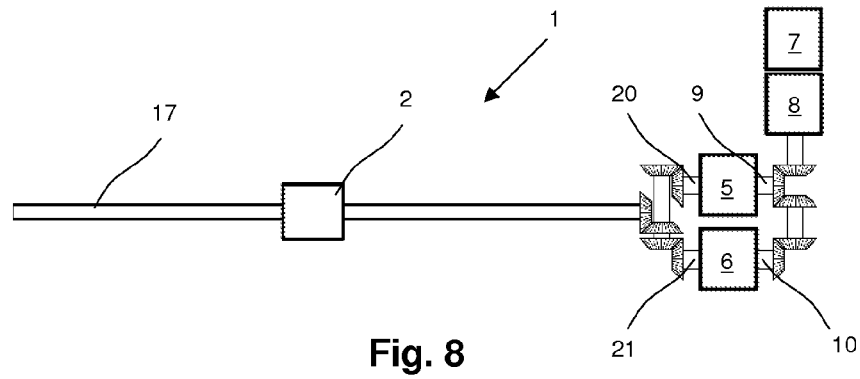
FIG. 8 shows a schematic representation of a further variant of the linear drive of the invention from FIG. 6.

FIG. 8 shows a further modification. In contrast to the embodiment of FIG. 7, the two drive units 3 and 4 are there realized by a single electric motor 7 with an attached gear unit 8, similar to the linear drive of FIG. 5. Here as well, the gear unit has two gear output shafts 9 and 10 which always rotate in directions opposite to each other.

Figure 9:
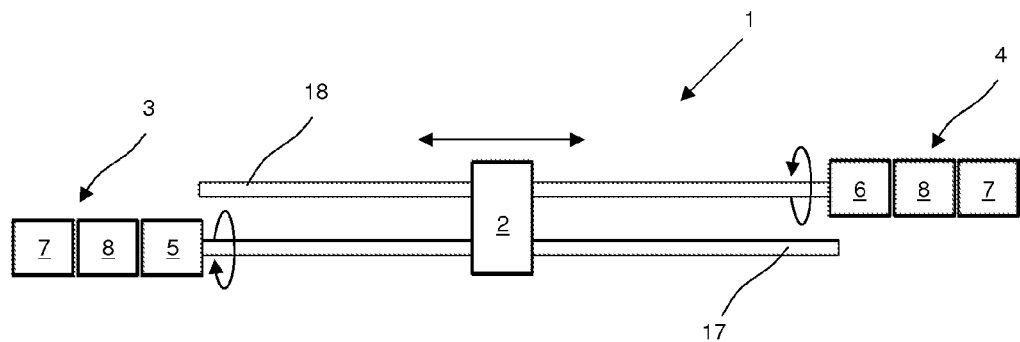
FIG. 9 shows a schematic representation of a linear drive of the invention according to a further embodiment.

FIG. 9 shows a further embodiment of the linear drive according to the invention. In this variant, two spindles 17 and 18 are provided extending parallel to each other. The two threaded spindles 17 and 18 mesh with a corresponding thread of the runner 2, which is movable along the longitudinal axis by rotating the threaded spindles. The two threaded spindles 17 and 18 can be brought into engagement with the drive units 3 and 4 using the magnetorheological clutches 5 and 6. The two drive units 3 and 4 are disposed at different ends of the two threaded spindles. For being able to apply the forces acting upon the two drive units 3 and 4 to the runner, it is necessary that either the output shafts of the two drive units 3 and 4 rotate in opposite directions or that the two threaded spindles 17 and 18 have opposite threads.

Figure 10:
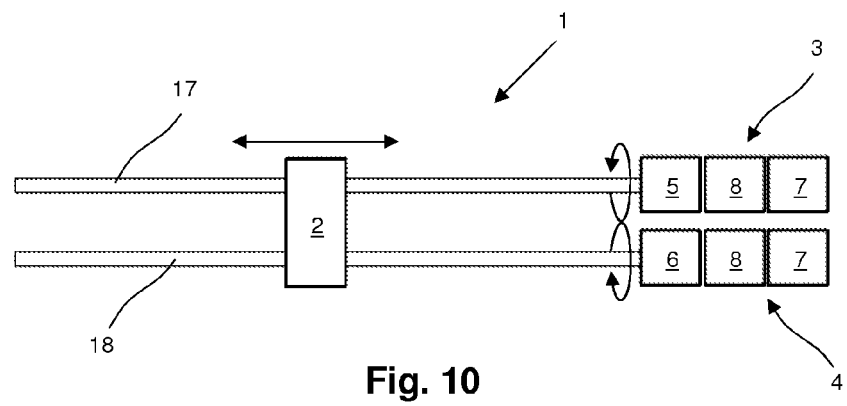
FIG. 10 shows a schematic representation of a variant of the linear drive from FIG. 9.
Figure 11:
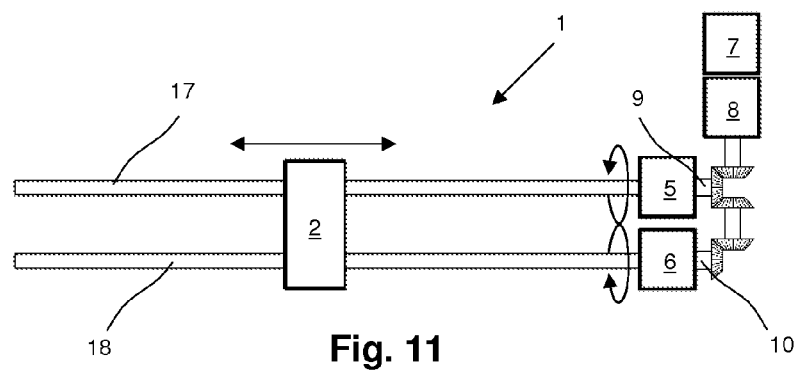
FIG. 11 shows a schematic representation of a further variant of the linear drive from FIG. 9.

FIG. 10 shows a modification of the linear drive of FIG. 9 in which the two drive units 3 and 4 are disposed at the same end of the two threaded spindles 17 and 18. The linear drive in this variant is designed slightly shorter than the drive of FIG. 9. The two drive units 3 and 4 and the associated magnetorheological clutches 5 and 6 are arranged directly adjacent to each other. It is therefore possible also in this variant, to realize the two drive units 3 and 4 by a single electric motor 7 with an attached gear unit 8, as shown in FIG. 11.

In all the embodiments shown of the linear drive according to the invention, actual value transmitter—not shown—can be provided for controlling. They can be rotary position transducers and/or tachometers and/or accelerometers.

The invention claimed is:

1. A linear drive, comprising:
   a stator,
   a runner,
   a first and second rotative drive unit provided for driving said runner, and
   a first and second magnetorheological clutch,
   wherein said first rotative drive unit is coupleable to said runner using the first magnetorheological clutch, and
   wherein said second rotative drive unit is coupleable to said runner by the second magnetorheological clutch,
   wherein said first rotative drive unit provides a first output torque that acts upon said runner and said second rotative drive unit provides a second output torque that acts upon said runner and wherein the first output torque always acts upon said runner in the opposite direction to the second output torque when the linear drive is in use.

2. The linear drive according to claim 1, further comprising:
   one electric motor as part of both said first rotative drive unit and as part of said second rotative drive unit,
   a gear unit connected to said electric motor,
   wherein said gear unit comprises a first and second counter-rotating gear output shaft,
   wherein the first counter-rotating gear output shaft is coupled to said first magnetorheological clutch, and the second counter-rotating gear output shaft is coupled to said second magnetorheological clutch.

3. The linear drive according to claim 1, wherein each of the first and second rotative drive units comprise their own electric motor.

4. The linear drive according to claim 3, wherein each of the first and second rotative drive units comprise their own gear unit.

5. The linear drive according to claim 1, further comprising a control unit for actuating said first and second magnetorheological clutches, wherein said control unit ensures that a first and a second output torque are always applied to said runner by the first and second rotative drive units, when the linear drive is in use.

6. The linear drive according to claim 5, wherein said control unit comprises an actual value transmitter.

7. The linear drive according to claim 6, wherein the actual value transmitter comprises a rotary position transducer, a speed indicator, an accelerometer, or a combination of any of these.

8. The linear drive according to claim 1, wherein said runner comprises a gear rack which is driven by a first gear or a worm gear coupleable to said first drive unit and by a second gear or worm gear coupleable to said second drive unit, wherein said first magnetorheological clutch and said second magnetorheological clutch are arranged directly adjacent to each other.

9. The linear drive according to claim 1, wherein said runner comprises a belt or a cable or a chain, wherein said belt or said cable or said chain forms a closed loop, and wherein said first and second rotative drive units are arranged in two opposed reversal points of said loop.

10. The linear drive according to claim 1, further comprising a threaded spindle.

11. The linear drive according to claim 10, wherein said threaded spindle is supported rotatably and axially undisplaceably relative to said stator of said linear drive, wherein said threaded spindle is in engagement with at least one of said first and second rotatable drive units and with said runner mounted axially displaceably relative to said stator.

12. The linear drive according to claim 11, further comprising a second threaded spindle extending parallel to said first threaded spindle and also being mounted rotatably and axially undisplaceably relative to said stator of said linear drive, wherein said first threaded spindle is in engagement with said runner and said first rotatable drive unit, and said second threaded spindle is in engagement with said runner and said second rotatable drive unit.

13. The linear drive according to claim 1, wherein said magnetorheological clutches each comprise a differential with a magnetorheological brake, said differential comprising one input member and two output members, and wherein one of said output members can be braked using said magneto-rheological brake.

* * * * *